(12) United States Patent
Topol

(10) Patent No.: US 11,300,141 B2
(45) Date of Patent: Apr. 12, 2022

(54) MODAL NOISE REDUCTION FOR GAS TURBINE ENGINE

(71) Applicant: United Technologies Corporation, Farmington, CT (US)

(72) Inventor: David A. Topol, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 416 days.

(21) Appl. No.: 16/532,554

(22) Filed: Aug. 6, 2019

(65) Prior Publication Data

US 2019/0376528 A1    Dec. 12, 2019

Related U.S. Application Data

(63) Continuation of application No. 14/680,409, filed on Apr. 7, 2015, now Pat. No. 10,371,168.

(51) Int. Cl.

| | |
|---|---|
| *F04D 29/66* | (2006.01) |
| *F01D 5/02* | (2006.01) |
| *F01D 5/12* | (2006.01) |
| *F01D 9/04* | (2006.01) |
| *F01D 25/04* | (2006.01) |

(Continued)

(52) U.S. Cl.
CPC ............. *F04D 29/661* (2013.01); *F01D 5/02* (2013.01); *F01D 5/12* (2013.01); *F01D 5/26* (2013.01); *F01D 9/041* (2013.01); *F01D 25/04* (2013.01); *F04D 29/324* (2013.01); *F04D 29/544* (2013.01); *F04D 29/663* (2013.01);

(Continued)

(58) Field of Classification Search
None
See application file for complete search history.

(56) References Cited

U.S. PATENT DOCUMENTS

| | | | |
|---|---|---|---|
| 2,258,792 A | 4/1941 | New | |
| 2,936,655 A | 5/1960 | Peterson et al. | |
| (Continued) | | | |

FOREIGN PATENT DOCUMENTS

| | | |
|---|---|---|
| EP | 0791383 | 8/1997 |
| EP | 1142850 | 10/2001 |
| (Continued) | | |

OTHER PUBLICATIONS

McMillian, A. (2008) Material development for fan blade containment casing. Abstract, p. 1. Conference on Engineering and Physics: Synergy for Success 2006. Journal of Physics: Conference Series vol. 105. London, UK. Oct. 5, 2006.

(Continued)

*Primary Examiner* — Igor Kershteyn
*Assistant Examiner* — Jason Fountain
(74) *Attorney, Agent, or Firm* — Carlson, Gaskey & Olds, P.C.

(57) ABSTRACT

An exemplary section of a gas turbine engine according to this disclosure includes, among other things, a first array of airfoils including a first number of airfoils, and a second array of airfoils downstream of the first array of airfoils. The second array includes a second number of airfoils. The second number of airfoils is at least 1.19 times the first number of airfoils thereby providing a predetermined modal.

30 Claims, 4 Drawing Sheets

(51) Int. Cl.
  *F04D 29/32* (2006.01)
  *F01D 5/26* (2006.01)
  *F04D 29/54* (2006.01)
(52) U.S. Cl.
  CPC ........ *F04D 29/666* (2013.01); *F05D 2260/96* (2013.01); *Y02T 50/60* (2013.01)

(56) References Cited

U.S. PATENT DOCUMENTS

| | | | |
|---|---|---|---|
| 3,021,731 | A | 2/1962 | Stoeckicht |
| 3,194,487 | A | 7/1965 | Tyler et al. |
| 3,287,906 | A | 11/1966 | McCormick |
| 3,352,178 | A | 11/1967 | Lindgren et al. |
| 3,412,560 | A | 11/1968 | Gaubatz |
| 3,664,612 | A | 5/1972 | Skidmore et al. |
| 3,747,343 | A | 7/1973 | Rosen |
| 3,754,484 | A | 8/1973 | Roberts |
| 3,765,623 | A | 10/1973 | Donelson et al. |
| 3,820,719 | A | 6/1974 | Clark |
| 3,843,277 | A | 10/1974 | Ehrich |
| 3,892,358 | A | 7/1975 | Gisslen |
| 3,932,058 | A | 1/1976 | Harner et al. |
| 3,935,558 | A | 1/1976 | Miller et al. |
| 3,988,889 | A | 11/1976 | Chamay et al. |
| 4,130,872 | A | 12/1978 | Harloff |
| 4,220,171 | A | 9/1980 | Ruehr |
| 4,240,250 | A | 12/1980 | Harris |
| 4,284,174 | A | 8/1981 | Salvana et al. |
| 4,289,360 | A | 9/1981 | Zirin |
| 4,478,551 | A | 10/1984 | Honeycutt, Jr. et al. |
| 4,649,114 | A | 3/1987 | Miltenburger et al. |
| 4,696,156 | A | 9/1987 | Burr et al. |
| 4,722,357 | A | 2/1988 | Wynosky |
| 4,979,362 | A | 12/1990 | Vershure, Jr. |
| 5,058,617 | A | 10/1991 | Stockman et al. |
| 5,102,379 | A | 4/1992 | Pagluica et al. |
| 5,141,400 | A | 8/1992 | Murphy et al. |
| 5,317,877 | A | 6/1994 | Stuart |
| 5,361,580 | A | 11/1994 | Ciokajlo et al. |
| 5,433,674 | A | 7/1995 | Sheridan et al. |
| 5,447,411 | A | 9/1995 | Curley et al. |
| 5,466,198 | A | 11/1995 | McKibbin et al. |
| 5,524,847 | A | 6/1996 | Brodell et al. |
| 5,634,767 | A | 6/1997 | Dawson |
| 5,677,060 | A | 10/1997 | Terentieva et al. |
| 5,692,702 | A | 12/1997 | Andersson |
| 5,778,659 | A | 7/1998 | Duesler et al. |
| 5,857,836 | A | 1/1999 | Stickler et al. |
| 5,915,917 | A | 6/1999 | Eveker et al. |
| 5,975,841 | A | 11/1999 | Lindemuth et al. |
| 5,985,470 | A | 11/1999 | Spitsberg et al. |
| 6,223,616 | B1 | 5/2001 | Sheridan |
| 6,315,815 | B1 | 11/2001 | Spadaccini et al. |
| 6,318,070 | B1 | 11/2001 | Rey et al. |
| 6,387,456 | B1 | 5/2002 | Eaton, Jr. et al. |
| 6,517,341 | B1 | 2/2003 | Brun et al. |
| 6,607,165 | B1 | 8/2003 | Manteiga et al. |
| 6,709,492 | B1 | 3/2004 | Spadaccini et al. |
| 6,814,541 | B2 | 11/2004 | Evans et al. |
| 6,883,303 | B1 | 4/2005 | Seda |
| 7,021,042 | B2 | 4/2006 | Law |
| 7,219,490 | B2 | 1/2007 | Dev |
| 7,328,580 | B2 | 2/2008 | Lee et al. |
| 7,374,403 | B2 | 5/2008 | Decker et al. |
| 7,591,754 | B2 | 9/2009 | Duong et al. |
| 7,632,064 | B2 | 12/2009 | Somanath |
| 7,662,059 | B2 | 2/2010 | McCune |
| 7,806,651 | B2 | 10/2010 | Kennepohl et al. |
| 7,824,305 | B2 | 11/2010 | Duong et al. |
| 7,828,682 | B2 | 11/2010 | Smook |
| 7,891,943 | B2 | 2/2011 | Tsuchiya et al. |
| 7,926,260 | B2 | 4/2011 | Sheridan et al. |
| 7,997,868 | B1 | 8/2011 | Liang et al. |
| 8,205,432 | B2 | 6/2012 | Sheridan |
| 8,534,991 | B2 | 9/2013 | Topol |
| 2006/0228206 | A1 | 10/2006 | Decker |
| 2008/0003096 | A1 | 1/2008 | Kohli et al. |
| 2008/0116009 | A1 | 5/2008 | Sheridan et al. |
| 2008/0317588 | A1 | 12/2008 | Grabowski et al. |
| 2009/0056343 | A1 | 3/2009 | Suciu et al. |
| 2009/0304518 | A1 | 12/2009 | Kodama et al. |
| 2009/0314881 | A1 | 12/2009 | Suciu et al. |
| 2010/0105516 | A1 | 4/2010 | Sheridan et al. |
| 2010/0148396 | A1 | 6/2010 | Xie et al. |
| 2010/0212281 | A1 | 8/2010 | Sheridan |
| 2010/0218483 | A1 | 9/2010 | Smith |
| 2010/0331139 | A1 | 12/2010 | McCune |
| 2011/0123342 | A1 | 5/2011 | Topol |
| 2011/0159797 | A1 | 6/2011 | Beltman et al. |
| 2011/0293423 | A1 | 12/2011 | Bunker et al. |
| 2012/0117975 | A1 | 5/2012 | Sharma et al. |
| 2012/0124964 | A1 | 5/2012 | Hasel et al. |
| 2013/0219922 | A1 | 8/2013 | Gilson et al. |
| 2014/0271112 | A1* | 9/2014 | Morin .................... F02C 3/107 |
| | | | 415/1 |

FOREIGN PATENT DOCUMENTS

| | | |
|---|---|---|
| GB | 1516041 | 6/1978 |
| GB | 2041090 | 9/1980 |
| GB | 2426792 | 12/2006 |
| WO | WO9603585 | 2/1996 |
| WO | 2005100750 | 10/2005 |
| WO | 2007038674 | 4/2007 |

OTHER PUBLICATIONS

Kurzke, J. (2009) Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1 -30, 50-1, 56-8, 60-1, 64-71, 87-9, 324-9, 436-7.

Carney, K., Pereira, M. Revilock, and Matheny, P. (2003) Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers, 108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

(56) References Cited

OTHER PUBLICATIONS

Willis, W.S. (1979). Quiet clean short-haul experimental engine (QCSEE) final report. NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press, p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, DC.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Baker, R.W. (2000). Membrane technology and applications. New York, NY: McGraw-Hill. pp. 87-153.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Technical review. Chevron Products Company, pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

(56) References Cited

OTHER PUBLICATIONS

Matsumoto, T., Toshiro, U., Kishida, A., Tsutomu, F., Maruyama, I., and Akashi, M. (1996). Novel functional polymers: Poly(dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Technical Data. Teflon. WS Hampshire Inc. Retrieved from: http://catalog.wshampshire.com/Asset/psg_teflon_ptfe.pdf.

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Edkins, D.P., Hirschkron, R., and Lee, R. (1972). TF34 turbofan quiet engine study. Final Report prepared for NASA. NASA-CR-120914. Jan. 1, 1972. pp. 1-99.

Waters, M.H. and Schairer, E.T. (1977). Analysis of turbofan propulsion system weight and dimensions. NASA Technical Memorandum. Jan. 1977. pp. 1-65.

Meyer, A.G. (1988). Transmission development of TEXTRON Lycoming's geared fan engine. Technical Paper. Oct. 1988. pp. 1-12.

Dudley, D.W., Ed. (1962). Gear handbook. New York, NY: McGraw-Hill. pp. 14-17 (TOC, Preface, and Index).

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Gates, D. Bombardier flies at higher market. Seattle Times. Jul. 13, 2008. pp. C6.

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

Drago, R.J. (1974). Heavy-lift helicopter brings up drive ideas. Power Transmission Design. Mar. 1987. pp. 1-15.

Krantz, T.L. (1990). Experimental and analytical evaluation of efficiency of helicopter planetary stage. NASA Technical Paper. Nov. 1990. pp. 1-19.

Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.

Thulin, R.D., Howe, D.C., and Singer, I.D. (1982). Energy efficient engine: High pressure turbine detailed design report. Prepared for NASA. NASA CR-165608. Received Aug. 9, 1984. pp. 1-178.

Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Gray, D.E. (1978). Energy efficient engine preliminary design and integration studies. Prepared for NASA. NASA CR-135396. Nov. 1978. pp. 1-366.

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.

McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.

Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.

Datasheet. CF6-80C2 high-bypass turbofan engines. Retreived from https://geaviation.com/sites/default/files/datasheet-CF6-80C2.pdf.

Salemme, C.T. and Murphy, G.C. (1979). Metal spar/superhybrid shell composite fan blades. Prepared for NASA. NASA-CR-159594. Aug. 1979. pp. 1-127.

"Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".

Datasheet. Genx ™ high bypass turbofan engines. Retreived from: https://www.geaviation.com/sites/default/files/datasheet-genx.pdf.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8). Start p. 32.

Hendricks, E.S. and Tong, M.T. (2012). Performance and weight estimates for an advanced open rotor engine. NASA/TM-2012-217710. pp. 1-13.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Zalud, T. (1998). Gears put a new spin on turbofan performance. Machine Design, 70(20), p. 104.

Kurzke, J. (2008). Preliminary Design, Aero-engine design: From state of the art turbofans towards innovative architectures. pp. 1-72.

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.

Han, J., Dutta, S., and Ekkad, S.V. (2000). Gas turbine heat transfer and cooling technology. New York, NY: Taylor & Francis. pp. 1-25, 129-157, and 160-249.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.

Declaration of Reza Abhari, Ph.D. In re U.S. Pat. No. 8,844,265. Executed Jun. 28, 2016. pp. 1-91.

Declaration of John Eaton, Ph.D. In re U.S. Pat. No. 8,869,568. Executed Mar. 28, 2016. pp. 1-87.

Declaration of Reza Abhari. In re U.S. Pat. No. 8,695,920. Executed Nov. 30. pp. 1-67.

(56) References Cited

OTHER PUBLICATIONS

Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., Macmartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/ AAR-82-8. p. 45-47.
Norton, M. and Karczub, D. (2003). Fundamentals of noise and vibration analysis for engineers. Press Syndicate of the University of Cambridge New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003.. p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28(9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76 (1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.

Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 855-860.
Bunker, R.S. (2005). A review of shaped hole turbine film-cooling technology. Journal of Heat Transfer vol. 127. Apr. 2005. pp. 441-453.
Notice of Opposition of European Patent No. 3093501 dated Jun. 26, 2019 by Safran Aircraft Engines.
Korte, D., Grondel, H., Gautier, S. and Kennepohl, F. (2004). Low noise compressor design with a linearized euler method. ECCOMAS 2004. Jul. 24-28, 2004. pp. 1-18.
Uslu, S. Hüttl, T., and Heinig, K. (2004). Simulation of noise generation due to blade row interaction in a high speed compressor. Aerospace Science and Technology 8. Jun. 2004. pp. 209-306.
Touyeras, A. and Villain, M. (2004). Aerodynamic design and test result analysis of a three stage research compressor. Proceedings of ASME Turbo Expo 2004: Power for Land, Sea, and Air. Jun. 14-17, 2004. pp 1-9.
Wolff, T., Herbst, F., Freund, O., Liu, L., and Seume, J.R. (2014). Validating the numerical prediction of the aerodynamics of an axial compressor. Proceedings of ASME Turbo Expo 2014: Turbine Technical Conference and Exposition. Jun. 16-20, 2014. pp. 1-14.
The jet engine. Rolls-Royce plc. 5th Edition. 1996. pp. 19-33.
Lowson, M.V. (1969). Theoretical studies of compressor noise. NASA-CR-1287. Mar. 1969. pp. 1-100.
Lowson, M.V. (1968). Reduction of compressor noise radiation. The Journal of the Acoustical Society of America vol. 43(1). pp. 37-50.
Winn, A. (Ed). (1990). Wide Chord Fan Club. Flight International, 4217(137). May 23-29, 1990. pp. 34-38.
Parker, R.G. and Lin, J. (2001). Modeling, modal properties, and mesh stiffness variation instabilities of planetary gears. Prepared for NASA. NASA/CR-2001-210939. May 2001. pp. 1-111.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1954). Handbook of practical gear design. Lancaster, PA: Technomic Publishing Company, Inc. pp. 3.96-102 and 8.12-18.

(56) References Cited

OTHER PUBLICATIONS

Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Product Brochure. Garrett TFE731. Allied Signal. Copyright 1987. pp. 1-24.
Honeywell Learjet 31 and 35/36 TFE731-2 to 2C Engine Upgrade Program. Sep. 2005. pp. 1-4.
Honeywell Sabreliner 65 TFE731-3 to -3D Engine Upgrade Program. Oct. 2005. pp. 1-4.
U.S. Department of Transportation: Federal Aviation Administration Type Certificate Data Sheet No. E6WE. Dated: May 9, 2000. p. 1-9.
Kurzke, J. (2012). GasTurb 12: Design and off-design performance of gas turbines. Retrieved from: https://www.scribd.com/document/153900429/GasTurb-12.
Ahmad, F. and Mizramoghadam, A.V. (1999). Single v. two stage high pressure turbine design of modern aero engines. ASME. Presented at the International Gas Turbine & Aeroengine Congress & Exhibition. Indianapolis, Indiana. Jun. 7-10, 1999. pp. 1-9.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
About GasTurb. Retrieved Jun. 26, 2018 from: http://gasturb.de/about-gasturb.html.
Kurzke, J. (2001). GasTurb 9: A program to calculate design and off-design performance of gas turbines. Retrieved from: https://www.scribd.com/document/92384867/GasTurb9Manual.
Tummers, B. (2006). DataThief III. Retreived from: https://datathief.org/DatathiefManual.pdf pp. 1-52.
Manual. Student's Guide to Learning SolidWorks Software. Dassault Systemes—SolidWorks Corporation. pp. 1-156.
Macisaac, B. and Langston, R. (2011). Gas turbine propulsion systems. Chichester, West Sussex: John Wiley & Sons, Ltd. pp. 260-265.
Datasheet. CFM56-5B For the Airbus A320ceo family and CFM56-7B for the Boeing 737 family. https://www.cfmaeroengines.com/.
Turner, M. G., Norris, A., and Veres, J.P. (2004). High-fidelity three-dimensional simulation of the GE90. NASA/TM-2004-212981. pp. 1-18.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Amfzketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.
Singh, A. (2005). Application of a system level model to study the planetary load sharing behavior. Jounal of Mechanical Design. vol. 127. May 2005. pp. 469-476.
Smith-Boyd, L. and Pike, J. (1986). Expansion of epicyclic gear dynamic analysis program. Prepared for NASA. NASA CR-179563. Aug. 1986. pp. 1-98.
Wikpedia. Torsion spring. Retrieved Jun. 29, 2018 from: https://en.wikipedia.org/wiki/Torsion_spring.
AGMA Standard (2006). Design manual for enclosed epicyclic gear drives. Alexandria, VA: American Gear Manufacturers Association. pp. 1-104.
AGMA Standard (1997). Design and selection of components for enclosed gear drives, lexandria, VA: American Gear Manufacturers Association. pp. 1-48.
Daly, M. Ed. (2007). Jane's Aero-Engine. Issue Twenty-three. Mar. 2008. p. 707-12.
AGMA Standard (1999). Flexible couplings—Mass elastic properties and other characteristics. Alexandria, VA: American Gear Manufacturers Association. pp. 1-46.
Wikipedia. Stiffness. Retrieved Jun. 28, 2018 from: https://en.wikipedia.org/wiki/Stiffness.

Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Gray, D.E. and Gardner, W.B. (1983). Energy efficient engine program technology benefit/cost study—vol. 2. NASA CR-174766. Oct. 1983. pp. 1-118.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Howe, D.C., and Wynosky, T.A. (1985). Energy efficient engine program advanced turbofan nacelle definition study. NASA-CR-174942. May 1985. pp. 1-60.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.
Mattingly, J.D. (1996). Elements of gas turbine propulsion. New York, New York: McGraw-Hill, Inc. pp. 1-18, 60-62, 223-234, 462-479, 517-520, 757-767, and 862-864.
Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.
Johnston, R.P. and Hemsworth, M.C. (1978). Energy efficient engine preliminary design and integration studies. Jun. 1, 1978. pp. 1-28.
Awker, R.W. (1986). Evaluation of propfan propulsion applied to general aviation. NASA CR-175020. Mar. 1, 1986. pp. 1-140.
Howe, D.C. and Wynosky, T.A. (1985). Energy efficient engine program advanced turbofan nacelle definition study. NASA CR-174942. May 1, 1985. pp. 174.
Singh, B. (1986). Small engine component technology (SECT) study. NASA CR-175079. Mar. 1, 1986. pp. 1-102.
Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.
Anderson, R.D. (1985). Advanced Propfan Engine Technology (APET) definition study, single and counter-rotation gearbox/pitch change mechanism design. NASA CR-168115. Jul. 1, 1985. pp. 1-289.
Newton, F.C., Liebeck, R.H., Mitchell, G.H., Mooiweer, M.A., Platte, M.M., Toogood, T.L., and Wright, R.A. (1986). Multiple

(56) References Cited

OTHER PUBLICATIONS

Application Propfan Study (MAPS): Advanced tactical transport. NASA CR-175003. Mar. 1, 2986. pp. 1-101.

Gliebe, P.R., Ho, P.Y., and Mani, R. (1995). UHB engine fan and broadband noise reduction study. NASA CR-198357. Jun. 1995. pp. 1-48.

Holcombe, V. (2003). Aero-Propulsion Technology (APT) task V low noise ADP engine definition study. NASA CR-2003-212521. Oct. 1, 2003. pp. 1-73.

Sutliff, D. (2005). Rotating rake turbofan duct mode measurement system. NASA TM-2005-213828. Oct. 1, 2005. pp. 1-34.

Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.

NASA Conference Publication. (1978). CTOL transport technology. NASA-CP-2036-PT-1. Jun. 1, 1978. pp. 1-531.

Kandebo, S.W. (1998). Geared-Turbofan engine design targets cost, complexity. Aviation Week & Space Technology, 148(8). p. 34-5.

Davis, D.G.M. (1973). Variable-pitch fans: Progress in Britain. Flight International. Apr. 19, 1973. pp. 615-617.

Levintan, R.M. (1975). Q-Fan demonstrator engine. Journal of Aircraft. vol. 12( 8). Aug. 1975. pp. 658-663.

Technical Report. (1975). Quiet Clean Short-haul Experimental Engine (QCSEE) UTW fan preliminary design. NASA-CR-134842. Feb. 1, 1975. pp. 1-98.

Aerospace Information Report. (2008). Advanced ducted propulsor in-flight thrust determination. SAE International AIR5450. Aug. 2008. p. 1-392.

Daggett, D.L., Brown, S.T., and Kawai, R.T. (2003). Ultra-efficient engine diameter study. NASA/CR-2003-212309. May 2003. pp. 1-52.

Michel, U. (2013). Aircraft noise reduction by technical innovations. AIAA/CEAS Aeroacoustics Conference. May 27-29, 2013. Berlin. pp. 1-50.

Ovenden, N.C., Eversman, W., and Rienstra, S.W. (2012). Cut-on cut-off transition in flow ducts: Comparing multiple-scales and finite-element solutions. American Institute of Aeronautics and Astronautics. AIAA 2004-2945. Retrieved from: https://arc.aiaa.org/doi/10.2514/6.2004-2945.

Sawyer, S. and Fleeter, S. (1996). Source control of turbomachine discrete-frequency tone generation. International Compressor Engineering Conference,. Paper 1198. Retrieved from: https://pdfs.semanticscholar.org/e357/b26490288e00dd7a846c7790c20df6e4b337.pdf.

European Search Report for European Patent Application No. 16164202.0 completed Oct. 10, 2016.

State of Grounds of Appeal in European Patent No. 3093051 (16164202.0) by Safran Aircraft Engines dated Jan. 5, 2022 [with English translation].

* cited by examiner

MODAL NOISE REDUCTION FOR GAS TURBINE ENGINE

CROSS-REFERENCE TO RELATED APPLICATION

This application is a continuation of U.S. patent application Ser. No. 14/680,409 filed Apr. 7, 2015.

BACKGROUND

A gas turbine engine typically includes a fan section, a compressor section, a combustor section, and a turbine section. The compressor section compresses air and delivers it into a combustion chamber. The compressed air is mixed with fuel and combusted in the combustion section. Products of this combustion pass downstream over turbine rotors. The compressor is typically provided with rotating blades, and stator vanes adjacent to the blades. The stator vanes control the flow of the air to blades. The arrangement between the stator vanes and the blades has an influence on the amount of noise (e.g., sound) generated by the engine.

SUMMARY

An exemplary section of a gas turbine engine according to this disclosure includes, among other things, a first array of airfoils including a first number of airfoils, and a second array of airfoils downstream of the first array of airfoils. The second array includes a second number of airfoils. The second number of airfoils is at least 1.19 times the first number of airfoils thereby providing a predetermined modal response.

In a further non-limiting embodiment of the foregoing section, the second number of airfoils is within a range between 1.19 and 1.55 times the first number of airfoils.

In a further non-limiting embodiment of the foregoing section, the range is defined by the following equation $$1 + \frac{M_{tip}\sin\theta}{1-M};$$

where $M_{tip}$ is a tip rotational Mach number, M is the Mach number into the second array from a frame of reference of the second array, and $\theta$ is a stagger angle of the second array.

In a further non-limiting embodiment of the foregoing section, the stagger angle is the incline of a chord between a leading edge and a trailing edge of an airfoil relative to a direction parallel to an engine central longitudinal axis.

In a further non-limiting embodiment of the foregoing section, the range is further defined by:

$$\frac{n}{k}\left(1 + \frac{M_{tip}\sin\theta}{1-M}\right)$$

when the upstream array is a rotor and the downstream array is a stator;

$$\frac{k}{n}\left(1 + \frac{M_{tip}\sin\theta}{1-M}\right)$$

when the upstream array is a stator and the downstream array is a rotor;

where n is the harmonic of blade passing frequency, and k is the harmonic of vane passing frequency.

In a further non-limiting embodiment of the foregoing section, n and k are equal to 1.

In a further non-limiting embodiment of the foregoing section, the section includes a plurality of arrays of airfoils, and a number of airfoils in each array is at least 1.19 times a number of airfoils in an immediately upstream array.

In a further non-limiting embodiment of the foregoing section, the number of airfoils in each array is within a range between 1.19 and 1.55 times the number of airfoils in the immediately upstream array.

In a further non-limiting embodiment of the foregoing section, the first array of airfoils is an array of stator vanes, and wherein the second array of airfoils is an array of rotor blades.

In a further non-limiting embodiment of the foregoing section, the section is a low pressure compressor.

A gas turbine engine according to an exemplary aspect of the present disclosure includes, among other things, a low pressure compressor including a first array of airfoils and a second array of airfoils downstream of the first array. The first array includes a first number of airfoils and the second array includes a second number of airfoils. The second number of airfoils is at least 1.19 times the first number of airfoils thereby providing a predetermined modal.

In a further non-limiting embodiment of the foregoing engine, the second number of airfoils is within a range between 1.19 and 1.55 times the first number of airfoils.

In a further non-limiting embodiment of the foregoing engine, the range is defined by the following equation $$1 + \frac{M_{tip}\sin\theta}{1-M};$$

where $M_{tip}$ is a tip rotational Mach number, M is the Mach number into the second array from a frame of reference of the second array, and $\theta$ is a stagger angle of the second array.

In a further non-limiting embodiment of the foregoing engine, the stagger angle is the incline of a chord between a leading edge and a trailing edge of an airfoil relative to a direction parallel to an engine central longitudinal axis.

In a further non-limiting embodiment of the foregoing engine, the range is further defined by:

$$\frac{n}{k}\left(1 + \frac{M_{tip}\sin\theta}{1-M}\right)$$

when the upstream array is a rotor and the downstream array is a stator;

$$\frac{k}{n}\left(1 + \frac{M_{tip}\sin\theta}{1-M}\right)$$

when the upstream array is a stator and the downstream array is a rotor;

where n is the harmonic of blade passing frequency, and k is the harmonic of vane passing frequency.

In a further non-limiting embodiment of the foregoing engine, n and k are equal to 1.

A method according to an exemplary aspect of this disclosure includes, among other things, controlling an interaction between a first array of airfoils and a second arrays of airfoils during operation of a gas turbine engine by providing a number of airfoils in the second array that is at least 1.19 times the number of airfoils in the first array. The second array of airfoils is downstream of the first array of airfoils.

In a further non-limiting embodiment of the foregoing method, the number of airfoils in the second array is within a range between 1.19 and 1.55 times the number of airfoils in the first array.

In a further non-limiting embodiment of the foregoing method, the range is defined by the following equation $$1 + \frac{M_{tip}\sin\theta}{1-M};$$

where $M_{tip}$ is a tip rotational Mach number, M is the Mach number into the second array from a frame of reference of the second array, and $\theta$ is a stagger angle of the second array.

In a further non-limiting embodiment of the foregoing method, the range is further defined by:

$$\frac{n}{k}\left(1 + \frac{M_{tip}\sin\theta}{1-M}\right)$$

when the upstream array is a rotor and the downstream array is a stator;

$$\frac{k}{n}\left(1 + \frac{M_{tip}\sin\theta}{1-M}\right)$$

when the upstream array is a stator and the downstream array is a rotor;
where n is the harmonic of blade passing frequency, and k is the harmonic of vane passing frequency.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
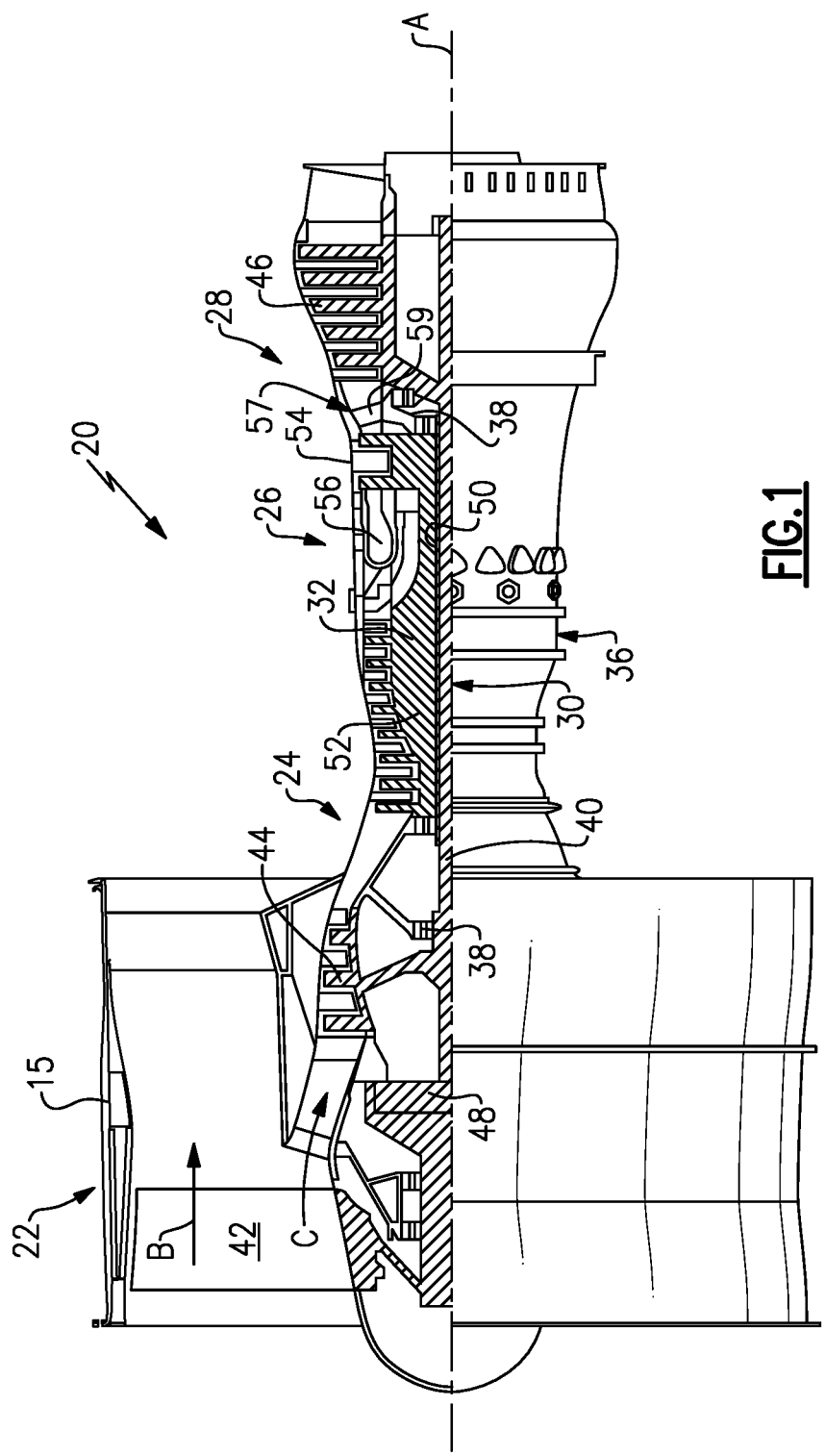
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

Figure 2:
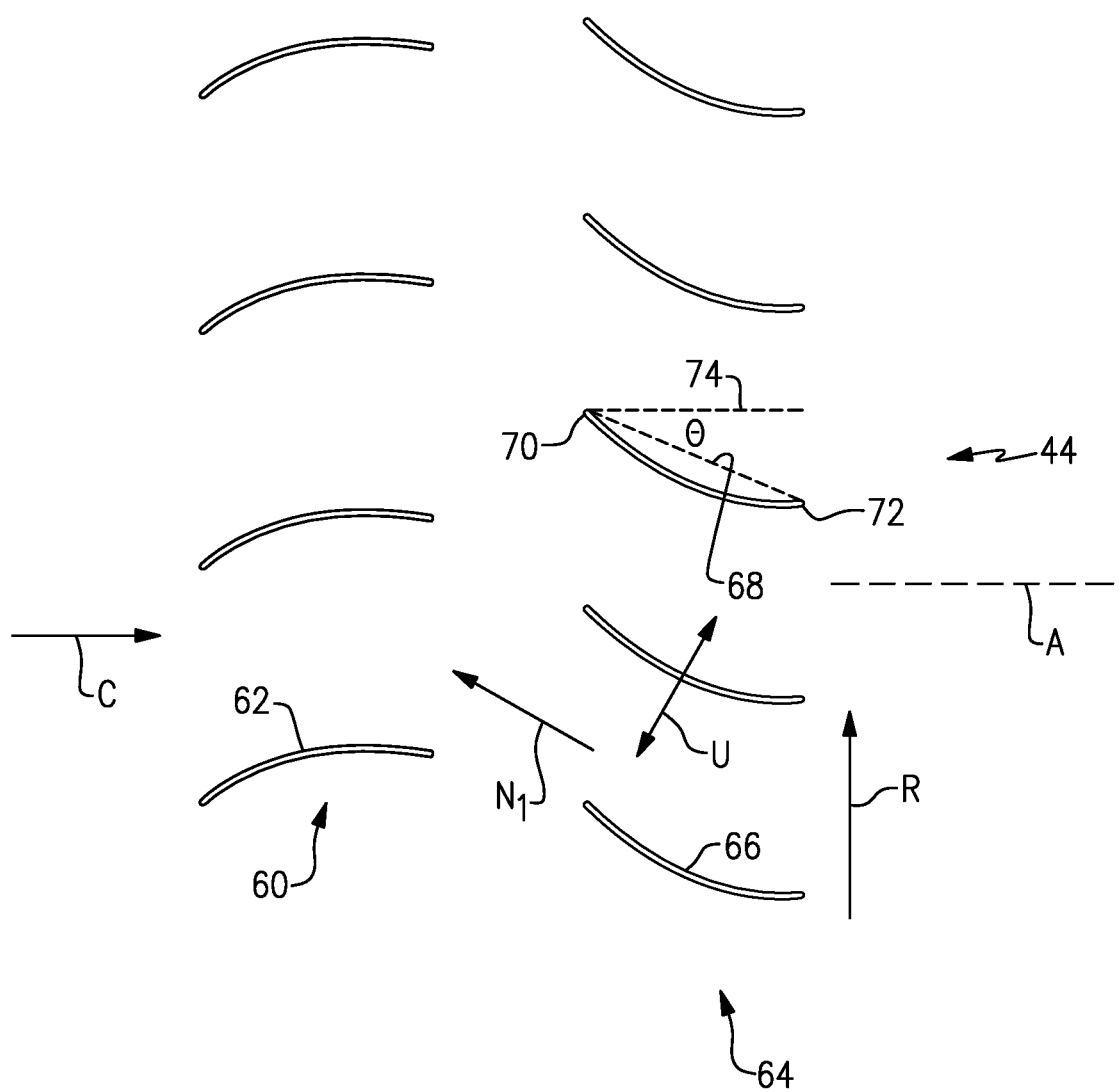
FIG. 2 is a highly schematic view of a section of the gas turbine engine, and in particular illustrates a modal, cuton interaction between adjacent airfoil arrays.

FIG. 2 is a highly schematic view of a portion of a section of the gas turbine engine 20. In this example, the section is the low pressure compressor 44. However, it should be understood that this disclosure may be useful in other sections of the gas turbine engine 20.

In this example, the low pressure compressor 44 includes a plurality of compression stages, each including an array of rotor blades and an array of stator vanes. FIG. 2 shows two adjacent airfoil arrays. A first array 60 includes a first number airfoils 62, which in this example may be stator vanes. A second array 64 of airfoils, which is immediately downstream of the first array 60, includes a second number of airfoils 66. Continuing with the example, the airfoils 66 in the second array 64 are rotor blades configured to rotate about the engine central longitudinal axis A.

The relationship between the number of airfoils in the first array 60 and the number of airfoils in the second array 62 can be controlled to reduce engine noise. To this end, a concept known as "cutoff" has been used in the design of compressors. "Cutoff" designs are typically used in larger engines. In a cutoff configuration, the vane-blade ratio is set such that the blade passing frequency decays in the duct. Another known concept is "high frequency." This solution is typically beneficial in engines with relatively high speed low pressure compressors. Another concept separate from "cutoff" and "high frequency" is called "cuton" (sometimes spelled "cut-on"). In a cuton configuration, the vane-blade ratio is set such that blade passing frequency propagates in the duct.

In this disclosure, the number of airfoils between adjacent arrays is selected such that, while not "cutoff," there is a controlled "modal" interaction between the adjacent arrays. As will be appreciated from the below, the nature of the "modal" interaction reduces sound effectively even though "cutoff" cannot be achieved.

In one example of this disclosure, each successive downstream array of airfoils in the low pressure compressor 44 includes more airfoils than the upstream array. In particular, the number of airfoils in the subsequent, downstream array is a factor of the number of airfoils in the immediately upstream array. In one example, the factor F is the same for each successive array, and is defined by the following equation:

$$F = 1 + \frac{M_{tip}\sin\theta}{1-M} \quad \text{(Equation 1)}$$

where, for the aircraft's approach power conditions, $M_{tip}$ is a tip rotational Mach number, M is the Mach number into the downstream array from the downstream array's frame of reference, and θ is a stagger angle of the downstream array. The factor F is a vane/blade ratio (V/B as defined below) when the upstream array is a rotor and the downstream array is a stator. The factor F is a blade/vane ratio (B/V as defined below) when the upstream array is a stator and the downstream array is a rotor. F can be defined in general by:

$$F = \frac{kV}{nB}; \text{ for upstream rotor, downstream stator} \quad \text{(Equation 2)}$$

$$F = \frac{kB}{nV}; \text{ for upstream stator, downstream rotor} \quad \text{(Equation 3)}$$

where n is the harmonic of blade passing frequency, B is the number of rotor blades in the blade row interaction, k is the harmonic of vane passing frequency, and V is the number of stator vanes in the stator row interaction. Further, in one example, the stagger angle θ is the incline of a chord 68 between a leading edge 70 and a trailing edge 72 of an airfoil relative to a line 74 parallel to the engine central longitudinal axis A. Alternatively, the stagger angle θ could be the angle of a line tangent to the leading edge.

In this example, the value for n is 1 because the first harmonic of blade passing frequency has the most significant impact on noise reduction. The value for k is also 1, because this is the only cuton mode for the first harmonic of blade passing frequency.

The result of the above Equations 1, 2, and 3 provides maximum noise reduction when in a "cuton" state when the factor F is at least 1.19. In particular, the maximum noise reduction is achieved when the factor F is within a range between 1.19 and 1.55. That is, for a rotor blade passing frequency, the number of airfoils in an array is within a range between 1.19 and 1.55 times the number of airfoils in the immediately upstream array.

The range of the factor F is further defined by the following equations, which are the result of combining Equations 1, 2, and 3.

$$\frac{V}{B} = \frac{n}{k}\left(1 + \frac{M_{tip}\sin\theta}{1-M}\right); \quad \text{(Equation 4)}$$

for an upstream rotor, downstream stator $$\frac{B}{V} = \frac{k}{n}\left(1 + \frac{M_{tip}\sin\theta}{1-M}\right); \quad \text{(Equation 5)}$$

for an upstream stator, downstream rotor

In one example, the first array 60 includes 30 stator vanes circumferentially spaced around a disk. In that example, the second array 64 could include between 36 and 47 rotor blades. Continuing with that example, a third array (not pictured) immediately downstream of the second array 64 could include between 43 and 56 stator vanes, and so on.

This could go on for as many interactions as required. In some cases only a portion of the stages within a particular engine section would be defined by this range. For instance, in a geared turbofan, in one example the first compressor stage may be cutoff while the second and third stages would be modal, cuton, and follow the range defined above. It should be noted that the term "stage" as used in this disclosure may refer to a stator-rotor-stator combination.

Figure 3:
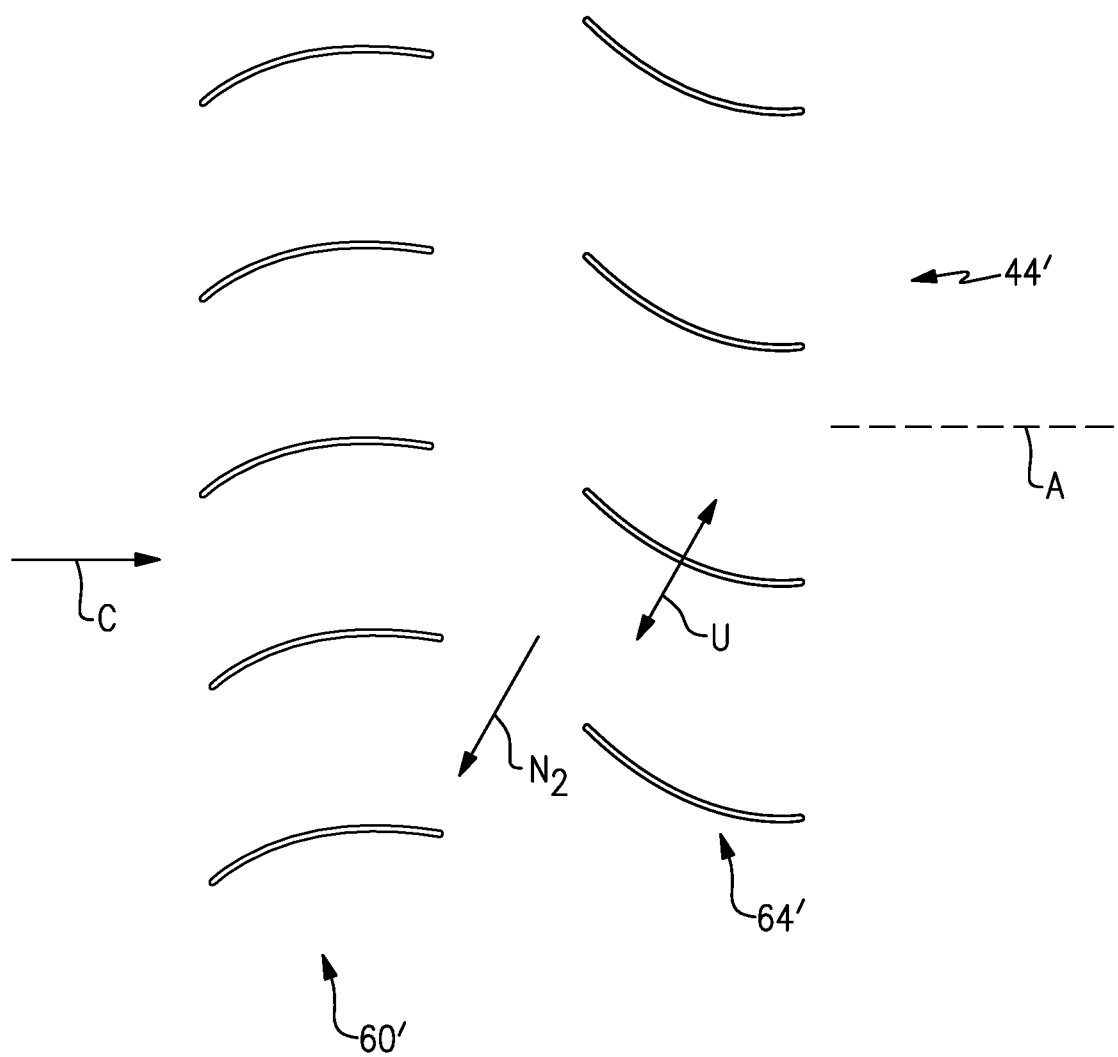
FIG. 3 is another highly schematic view of the section of the gas turbine engine, and in particular illustrates a non-modal, cuton interaction between adjacent airfoil arrays.

The effect of selecting the relative number of airfoils using the factor F is illustrated schematically between FIGS. 2 and 3. With reference to FIG. 2, a modal, cuton arrangement is illustrated. In FIG. 2, the number of airfoils 66 in the second array 64 is dictated by the factor F. As the rotor blades of the second array 64 rotate during operation of the gas turbine engine 20, a pulsing, unsteady pressure is distributed along each airfoil 66. The average direction of this pulsing, unsteady pressure is illustrated at U, and is known as the direction of unsteady lift. The average direction of the unsteady lift U is substantially perpendicular to the direction of the chord 68.

Because of the selected number of airfoils between the first array 60 and the second array 64, noise (i.e., sound) propagates generally in the direction $N_1$. As illustrated, the noise wave propagation direction $N_1$ is substantially perpendicular to the direction of the unsteady lift U. Thus, the pulsating pressure waves of the unsteady lift U do not couple effectively with the noise waves. As a result, the amplitude of the noise waves generated by this interaction is reduced, which in turn reduces noise.

FIG. 3 illustrates a non-modal, cuton arrangement. In FIG. 3, an example low pressure compressor 44' includes a first, upstream array 60' having a number of airfoils that outnumbers those of the second, downstream array 64'. In this example, noise propagates in a direction $N_2$, which is substantially parallel to the direction of unsteady lift U. In this instance, the pressure waves from the unsteady lift U couple better with the noise waves than they do in the FIG. 2 arrangement, and thus there is no significant noise reduction.

Figure 4:
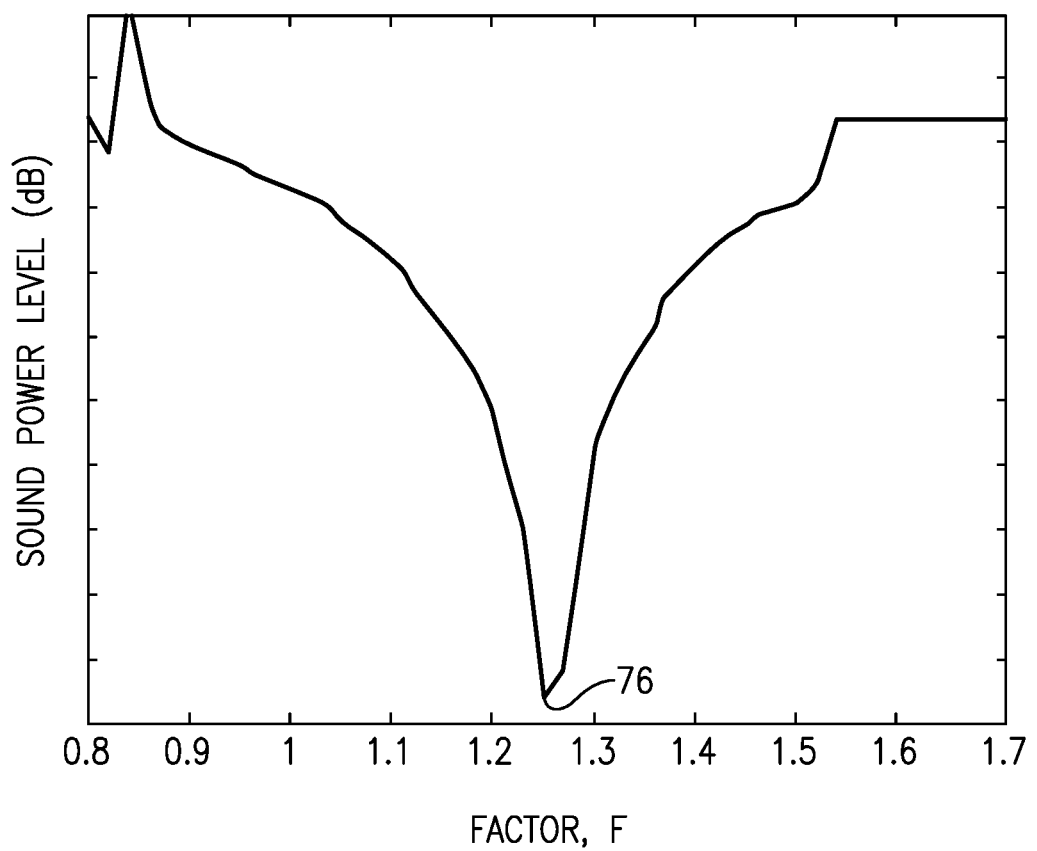
FIG. 4 graphically illustrates the relationship between sound power level and the ratio between the number of airfoils in a downstream array versus the number of airfoils in a upstream array.

FIG. 4 graphically illustrates the relationship between sound power level, in decibels (dB), and the factor F. As mentioned above, when "cutoff" is not possible, maximum noise reduction is achieved when the factor F is within a range between 1.19 and 1.55. As shown above in Equation 1, the factor F is variable based on a number of factors. One particular factor is airfoil shape (including, as examples, characteristics like airfoil camber and airfoil metal angle distribution along the chord), which is captured by stagger angle θ in this example. FIG. 4 shows a plot of sound power level to the factor F for a particular stagger angle θ. In this example, the largest amount of sound reduction is achieved at point 76, which corresponds to a factor F of about 1.25. This factor F is within the range between 1.19 and 1.55 mentioned above.

As mentioned, this disclosure provides a modal, cuton airfoil arrangement, which achieves substantial noise reduction relative to non-modal cuton arrangements. This disclosure has particular benefit in small engines that cannot achieve a cutoff arrangement. As mentioned above, this disclosure has benefits in other engines where certain stages can be "cutoff," while others may benefit from a modal, cuton interaction.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A turbofan engine, comprising:
   a fan section including a fan, and an outer housing surrounding the fan to define a bypass duct;
   a compressor section including a low pressure compressor and a high pressure compressor;
   a bypass ratio defined as a volume of air passing into the bypass duct compared to a volume of air passing into the compressor section, wherein the bypass ratio is greater than 10;
   a geared architecture; and
   a turbine section including a low pressure turbine and a high pressure turbine, wherein the high pressure turbine drives the high pressure compressor, and the low pressure turbine drives the fan through the geared architecture;
   wherein the low pressure compressor includes a plurality of arrays of airfoils defining a plurality of compressor stages; and
   wherein a number of airfoils in each downstream array of the plurality of arrays is a factor (F) of a number of airfoils in a respective immediately upstream array of the plurality of arrays, the factor (F) is at least 1.19 for at least one of the downstream arrays, and the factor (F) is defined by the following formula:

$$F = 1 + \frac{M_{tip}\sin\theta}{1-M}$$

wherein $M_{tip}$, is a tip rotational Mach number at an approach power condition, M is the Mach number into the downstream array from a frame of reference of the downstream array at the approach power condition, θ is a stagger angle of the downstream array, and the stagger angle is an incline of a chord between a leading edge and a trailing edge of an airfoil of the downstream array relative to a direction parallel to an engine central longitudinal axis.

2. The turbofan engine as recited in claim 1, wherein the factor (F) is between 1.19 and 1.55 for the at least one of the downstream arrays.

3. The turbofan engine as recited in claim 2, wherein the immediately upstream array is an array of stator vanes, and the downstream array is an array of rotor blades rotatable about the engine central longitudinal axis.

4. The turbofan engine as recited in claim 2, wherein the geared architecture is an epicyclic gear train.

5. The turbofan engine as recited in claim 4, wherein the plurality of compressor stages includes three compressor stages.

6. The turbofan engine as recited in claim 5, wherein the factor (F) is at least 1.19 for each downstream array in at least two compressor stages of the three compressor stages.

7. The turbofan engine as recited in claim 6, wherein the high pressure turbine is a two stage turbine.

8. The turbofan engine as recited in claim 7, wherein the number of airfoils in each successive downstream array of the low pressure compressor is greater than the number of airfoils in the respective immediately upstream array.

9. The turbofan engine as recited in claim 8, wherein the factor (F) is less than 1.19 for the downstream array in a first compressor stage of the plurality of compressor stages.

10. The turbofan engine as recited in claim 8, wherein the immediately upstream array includes 30 airfoils.

11. The turbofan engine as recited in claim 10, wherein the downstream array includes 36 airfoils.

12. The turbofan engine as recited in claim 11, wherein the low pressure turbine includes an inlet, an outlet, and a low pressure turbine pressure ratio greater than 5:1, wherein the low pressure turbine pressure ratio is a ratio of a pressure measured prior to the inlet as related to a pressure at the outlet prior to any exhaust nozzle.

13. The turbofan engine as recited in claim 12, wherein the downstream array includes 43 airfoils.

14. The turbofan engine as recited in claim 12, wherein the low pressure turbine includes a greater number of turbine stages than a total number of compressor stages of the low pressure compressor.

15. The turbofan engine as recited in claim 14, wherein the factor (F) is at least 1.19 for each downstream array of the low pressure compressor.

16. The turbofan engine as recited in claim 15, wherein the factor (F) is between 1.19 and 1.55 for each downstream array of the low pressure compressor.

17. The turbofan engine as recited in claim 16, wherein each downstream array is an array of rotor blades rotatable about the engine central longitudinal axis.

18. The turbofan engine as recited in claim 17, wherein the respective immediately upstream array is an array of stator vanes.

19. The turbofan engine recited in claim 18, wherein the factor (F) is defined with respect to a first harmonic of a blade passing frequency of the rotor blades and with respect to a first harmonic of a vane passing frequency of the stator vanes.

20. The turbofan engine as recited in claim 19, wherein the low pressure turbine includes five stages.

21. The turbofan engine as recited in claim 14, wherein the epicyclic gear train is a planetary gear system.

22. The turbofan engine as recited in claim 21, wherein the epicyclic gear train defines a gear reduction ratio of greater than 2.3.

23. The turbofan engine as recited in claim 22, wherein the factor (F) is between 1.19 and 1.55 for each downstream array in second and third compressor stages of the low pressure compressor.

24. The turbofan engine as recited in claim 23, wherein the factor (F) is less than 1.19 for the downstream array in a first compressor stage of the low pressure compressor.

25. The turbofan engine as recited in claim 23, wherein the factor (F) is between 1.19 and 1.55 for each downstream array of the low pressure compressor.

26. The turbofan engine as recited in claim 25, wherein each downstream array is an array of rotor blades rotatable about the engine central longitudinal axis, and the respective immediately upstream array is an array of stator vanes.

27. The turbofan engine recited in claim 26, wherein the factor (F) is defined with respect to a first harmonic of a blade passing frequency of the rotor blades and with respect to a first harmonic of a vane passing frequency of the stator vanes.

28. The turbofan engine as recited in claim 27, wherein the low pressure turbine includes five stages.

29. The turbofan engine as recited in claim 28, wherein the factor (F) is the same for each successive downstream array of the plurality of arrays of airfoils.

30. The turbofan engine as recited in claim 29, wherein the factor (F) is about 1.25.

* * * * *